Dec. 17, 1929.        C. FAULHABER        1,740,396
BOG CUTTER AND ROAD LEVELER
Filed Sept. 10, 1927
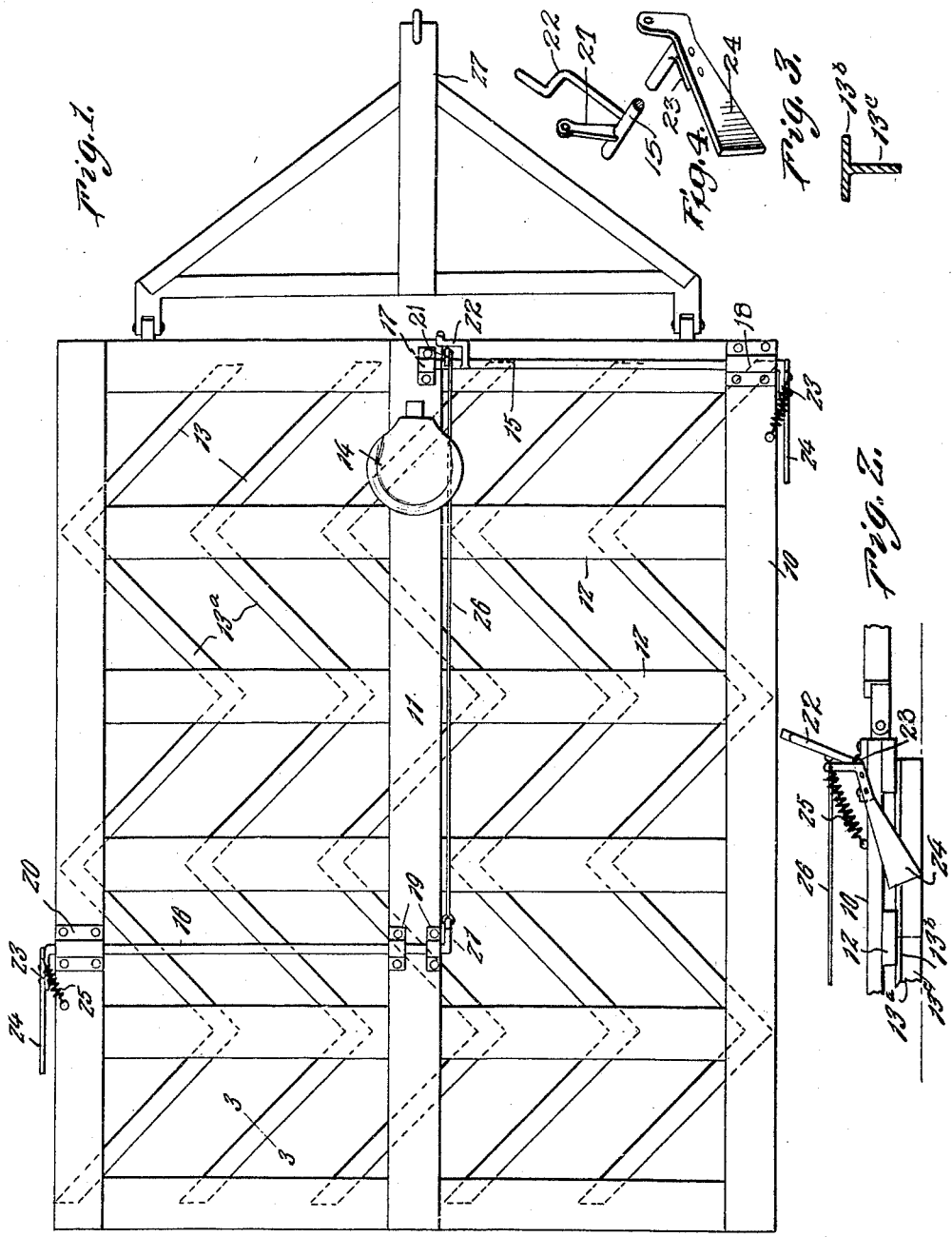
Charles Faulhaber
INVENTOR
BY Victor J. Evans
ATTORNEY Patented Dec. 17, 1929

1,740,396

UNITED STATES PATENT OFFICE

CHARLES FAULHABER, OF BROWNLEE, NEBRASKA, ASSIGNOR TO IRVING FAULHABER, OF EUGENE, OREGON, AND RUBY McDONALD, OF BROWNLEE, NEBRASKA

BOG CUTTER AND ROAD LEVELER

Application filed September 10, 1927. Serial No. 218,711.

The present invention relates to drags and is particularly adapted for use in leveling roads and bogs.

An object of the invention is to improve devices of this character and to make them more effective in leveling the ground.

Other objects are to so arrange the elements of the drag that it will not do injury to grass and other small shrubbery.

Further objects are simplicity and cheapness, strength of construction, effectiveness and simplicity of operation.

Other objects and advantages will appear from the following specification and will be set forth in the appended claim, and I do not wish to be limited in the scope of my invention except as I shall be limited by said claim.

In the drawings:

Figure 1 is a plan view of my device, showing the frame and the arrangement of the scraper blades thereon.

Figure 2 is a detail of a knife located along the side of the frame.

Figure 3 is a cross section on the line 3—3 of Figure 1, showing in detail the construction of one of the knives or scrapers.

Figure 4 is a fragmentary perspective view of details.

Referring to the drawings in detail, 10 are the side members of the frame; 11 is a center beam, to which side members and center beam are secured a plurality of cross members 12 lying in spaced relation to each other.

Arranged in zigzag formation in a general direction longitudinally of the frame are scraper members 13 made up of lengths of material and extending between each of the cross members 12, each alternative length running in opposite directions, as at 13 and 13ª in Figure 1 of the drawings. The shape of these scrapers is T-shaped as shown in Figure 3, in which it will appear that there is a top supporting member 13ᵇ and a blade or cutter 13ᶜ extending downwardly therefrom and designed to contact with the roadway.

Mounted on the front of the frame is a suitable seat 14 and rearwardly of the seat and forwardly thereof are transverse rods 15 and 16 journaled respectively to the center beam 11 and one of the side members 10, the two rods extending to opposite sides of the frame and the journals being in the form of straps 17, 18, 19 and 20, the inner ends of each rod having a crank arm 21 thereon which may be suitably connected with a hand lever 22, the outer ends of the rods being also provided with angularly extending arms 23 to which is attached the side cutting blades 24 having square cornered ground penetrating edges and are held by springs 25 attached thereto at one end and at the other end attached to the frame. The arms 21 are connected by means of a flexible link 26.

There may be provided at the forward end of the machine suitable draft means 27 to which horses may be hooked, or by which the drag may be connected with a tractor.

In operation, the device is hooked to a tractor, or to a team of horses, and dragged along the ground, whereupon the surface of the ground will be scraped by the blades 13ᶜ, thereby being dragged and moving first in one direction for a distance equal to the space between the members 12, when it will be deposited and a little later taken up by the scraper of the adjacent series. The dirt will be alternately moved sidewise in this manner until the drag has passed all of the way thereover. In this manner it will be seen that the dirt will become thoroughly pulverized and will be deposited in the low places while being scraped off of the high places, in this manner leveling the ground in its wake and avoiding the necessity of having to go over the same ground several times to accomplish this purpose. The side knives or blades 24 act as markers and may be adjusted to cut to any depth. They also act to raise the drag slightly, relieving the pressure to an extent on the blades 13ᶜ.

Having described my invention, what I claim is:

In a device of the character described, a frame, draft means for said frame, a plurality of zigzag longitudinally extending spaced scraper blades secured to said frame, transversely disposed rods extending in opposed direction with respect to each other from the center of the frame to the outer sides thereof and one of said rods being journaled at the front of the frame while the other is journaled adjacent the rear thereof, crank arms formed with the inner ends of said rods, a link connected to the crank arms whereby the rods are movable in unison, angularly extending arms formed with the outer ends of said rods, spring pressed cutter blades secured to the angularly extending arms and having square cornered ground penetrating edges and a hand lever formed with the forward rod.

In testimony whereof I affix my signature.

CHARLES FAULHABER.